E. P. NICHOLS.
AUTOMATIC GRADE MARKER FOR SHOE SOLES, &c.
APPLICATION FILED MAR. 1, 1912.
1,119,367.
Patented Dec. 1, 1914.
5 SHEETS—SHEET 1.
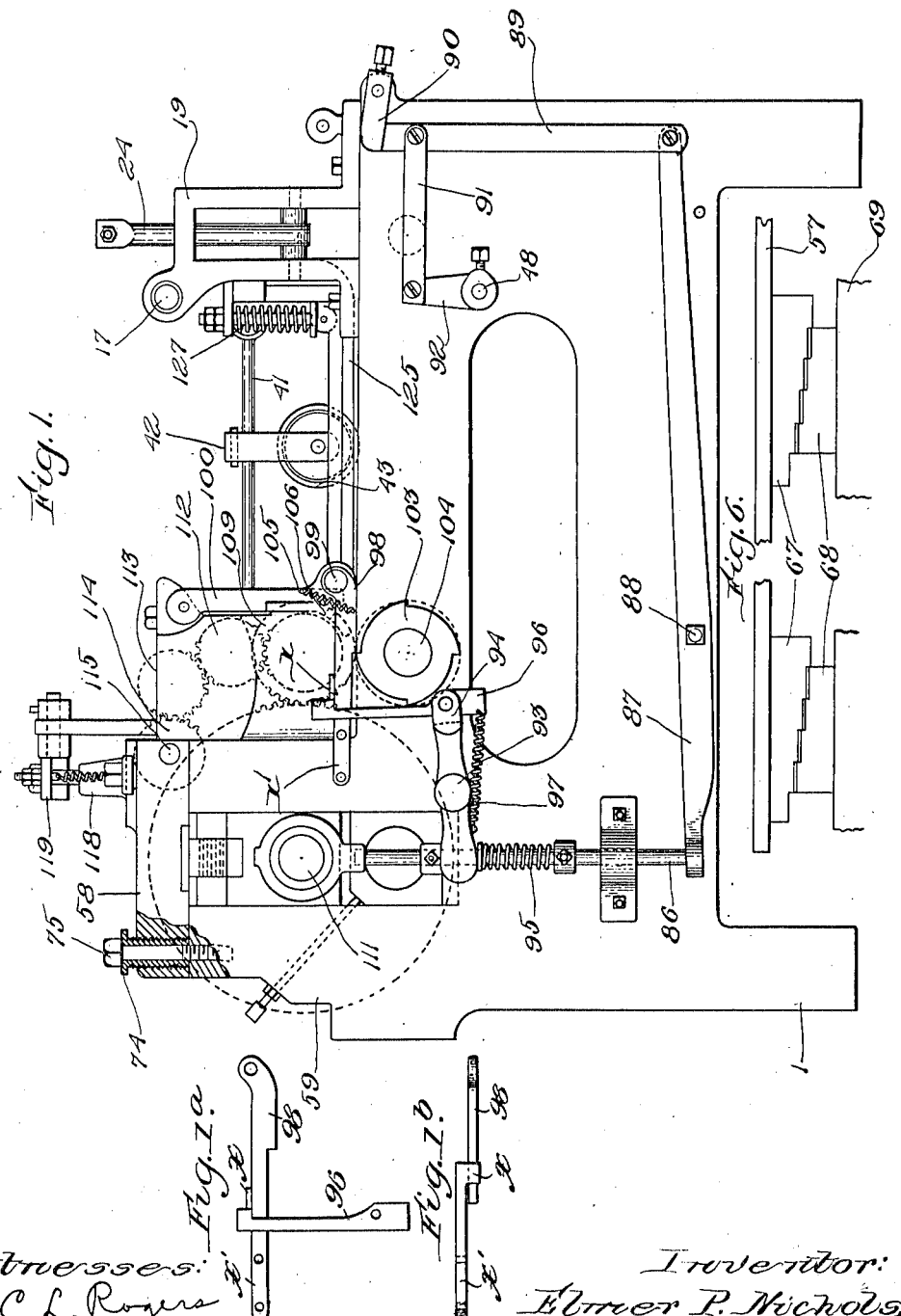
Witnesses:
C. L. Rogers
Edward Maxwell
Inventor:
Elmer P. Nichols,
by Geo. W. Maxwell
Atty.

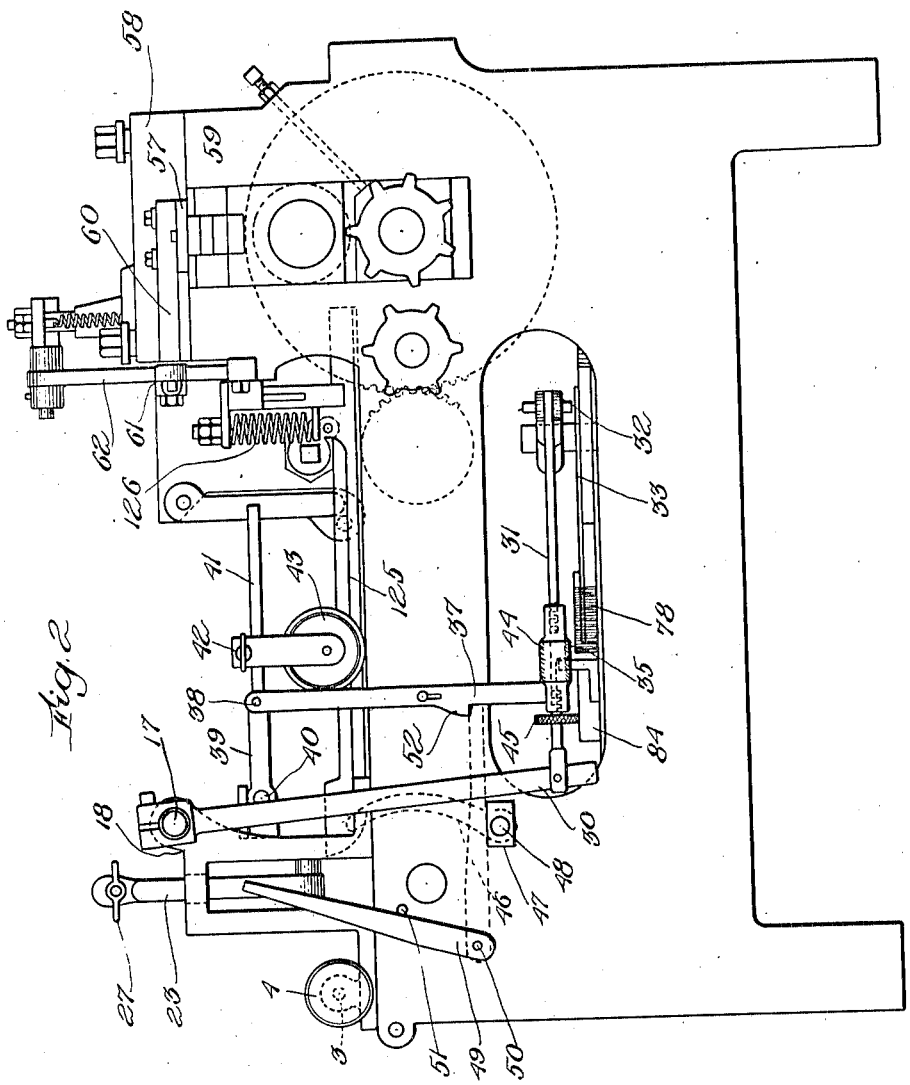

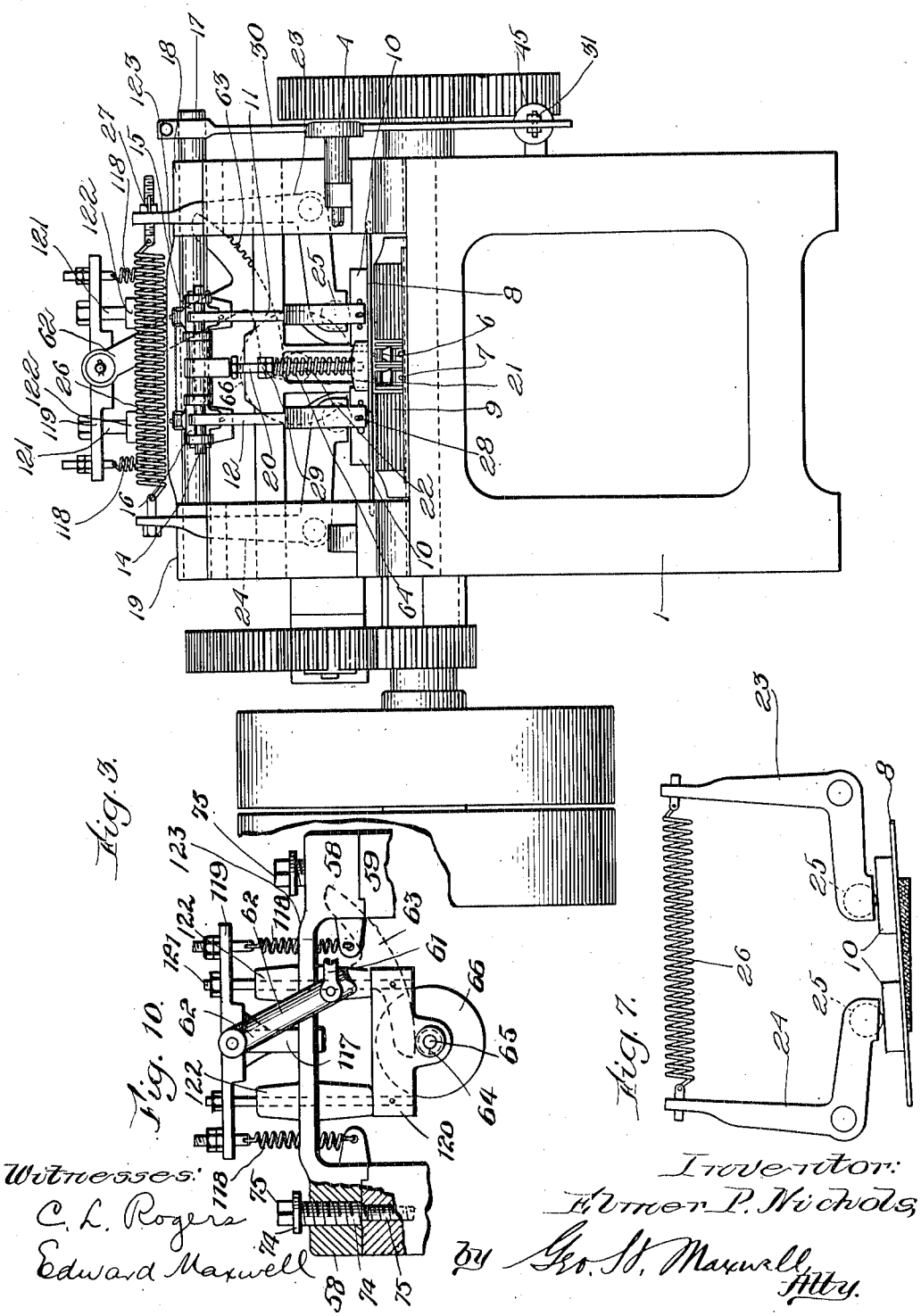

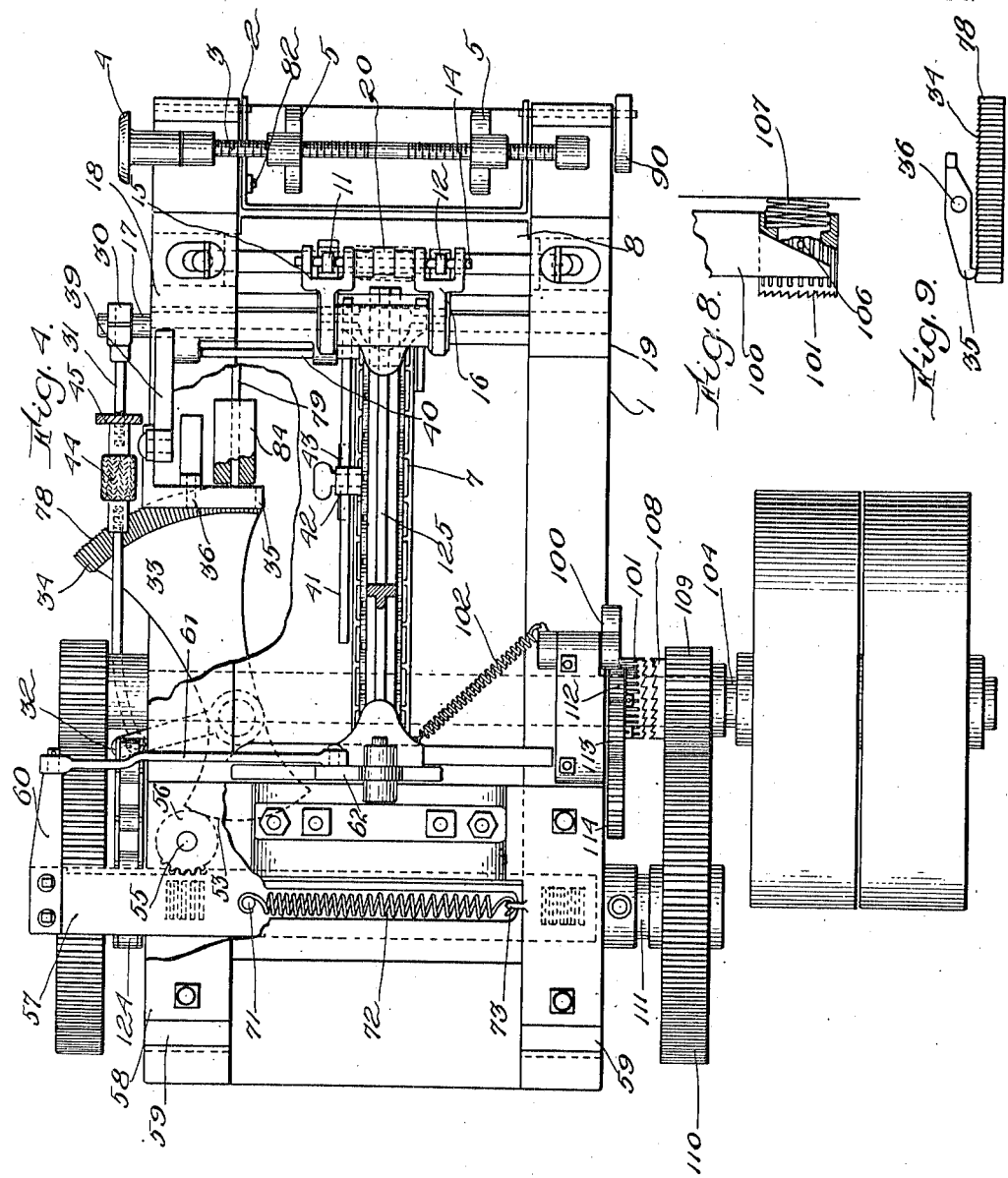

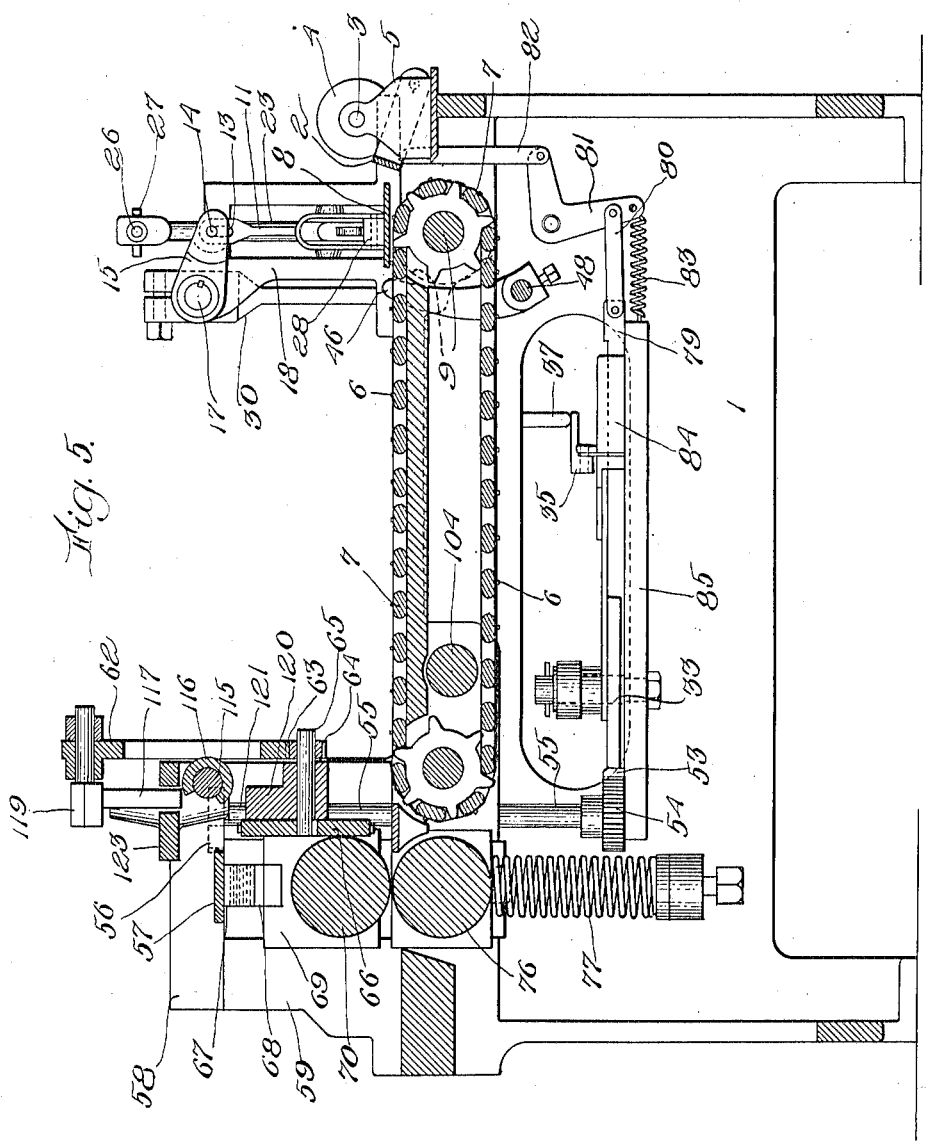

UNITED STATES PATENT OFFICE.

ELMER P. NICHOLS, OF MANCHESTER, NEW HAMPSHIRE, ASSIGNOR TO LACENE MANUFACTURING COMPANY, OF MANCHESTER, NEW HAMPSHIRE, A CORPORATION OF MAINE.

AUTOMATIC GRADE-MARKER FOR SHOE-SOLES, &c.

1,119,367.            Specification of Letters Patent.          Patented Dec. 1, 1914.

Original application filed April 27, 1905, Serial No. 257,587. Divided and this application filed March 1, 1912. Serial No. 680,861.

*To all whom it may concern:*

Be it known that I, ELMER P. NICHOLS, a citizen of the United States, and resident of Manchester, in the county of Hillsboro and State of New Hampshire, have invented an Improvement in Automatic Grade-Markers for Shoe-Soles, &c., of which the following description, in connection with the accompanying drawings, is a specification, like letters on the drawings representing like parts.

This application is a division of the parent application, Serial No. 257,587, filed April 27, 1905, now Patent No. 1,046,213, dated December 3, 1912, which related to an improved evening and grading machine along the line of work originally set forth in my patents of November 22, 1904, Reissue No. 12,288, and January 22, 1907, No. 841,809.

My object is, as before, to classify the leather pieces automatically in response to the determinations of feeler means, the present application being restricted to those features and combinations relating more particularly to the visual indicating of the grade, preferably by the marking of the grade upon the leather piece.

As the invention in its general scope and all the details of construction and operation of the preferred embodiment of the invention as a whole are set forth at length in the original application from which this is taken, I here omit the elaboration of said details and the invention as a whole, and refer to the original application therefor.

In the drawings, Figure 1 is a left-hand side elevation of the machine; Figs. 1ª and 1ᵇ show details of Fig. 1 in enlarged side elevation and plan respectively; Fig. 2 shows the machine in right-hand side elevation; Fig. 3 is a front end view thereof; Fig. 4 is a top plan view; Fig. 5 is a central vertical longitudinal section, parts being omitted for clearness; Fig. 6 is a slightly enlarged side elevation of the adjusting wedges and adjacent parts; Fig. 7 is a view illustrating the operation of the feeler or detecting mechanism at the front of the machine; Fig. 8 is a detail, in front elevation, of a portion of the clutch mechanism or tripping device for the grade marker; Fig. 9 is a detail of a portion of the grade-setting and locking mechanism. Fig. 10 is a fragmentary detail in front elevation, partly broken away, showing portions of the machine at the upper rear part.

Viewing more particularly Figs. 3, 4, and 5, it will be seen that I have provided in the frame 1 above the gate 2 a guide-carrying rod 3 operated by a hand wheel 4 and provided with right and left threads for moving simultaneously to equidistant positions from the center of the machine, opposite guides 5 whereby the operator may quickly set the machine for running through any width of stock. This gate rises at the proper time for permitting the feeding in of stock and then falls automatically. As the stock is fed in, it strikes the prongs 6 of the feed chain 7 and is carried beneath the feeler plate 8, preferably made of thin and resilient steel, as best shown in Figs. 3 and 5, whereby as the stock is raised against said plate by the feed chain 7 and the feed roll 9, said plate yields to the variations of thickness, as clearly shown in Fig. 7. On its upper side the plate 8 is provided with opposite blocks 10 engaged by vertical posts 11, 12, slotted at their upper ends 13, see Fig. 5, for engaging a transverse pin or rod 14 mounted in the outer free ends of opposite arms 15, 16 fast on a rock shaft 17 journaled in opposite standards 18, 19 of the frame. The slots 13 are provided for permitting one post to remain up while the other post is pulling downwardly and operating said rock shaft when feeling a thin spot along the adjacent edge of the leather whose condition is being detected and determined. On the rod 14, is mounted a rod 20 extending loosely into a block 21 which in turn sets loosely on the middle of the plate 8 and supports a spring 22 on said rod. In the opposite standards 18 and 19 are pivotally mounted opposite bell-crank levers 23, 24 whose lower arms carry rollers 25 freely engaging the upper ends of the blocks 10 respectively, their upper arms being connected to a spring 26 adjustable by a thumb nut 27 for regulating the tension of said bell-cranks or elbow-levers and constituting an equalizer for applying balanced pressure upon the opposite edges of the work being detected.

For different widths of stock I adjust the posts 11, 12 on the blocks 10 by any convenient means, as by a pin and slot adjustment 28. This pin and slot connection also serves to hold the rod 14 and said posts 11 and 12 positively secured to the plate 8,—at said points 28,—so that the upward bending of the plate between said points 28 (in response to a thick place, for instance, in the central body of a sole, as the plate is pressed downward by the levers 23, 24 and their spring 26, at the opposite edges of the sole, at either side of said supposed thick spot) can only take place to the extent permitted by the spring 22 (connected by rod 20 to said rod 14, as already explained). The tension of the spring 22 is controlled by a nut 29 for controlling the flexibility of the plate 8 and also giving quick responsiveness to the detector-transmitting mechanism, as will be more fully explained later. The stronger the tension of the spring 22, the less can the plate 8 bend upwardly in the middle, and hence the greater is its tendency to remain rigid, thereby readily accommodating the machine to narrow stock, such as counters and unusually soft stock such as is occasionally found in soles.

At the outer end of the rock shaft 17 is a crank 30 connected by a link 31 to an arm 32 of a pivotally mounted sector 33 having teeth 34 for operating with a pawl 35 pivoted at 36 and operated by a sliding bar 37 pivoted at 38 to an arm 39 projecting from a shaft 40 provided at its opposite end with an arm 41 carrying an adjustable slide 42 and roll 43 for engaging the forward end of the stock as it is fed in the machine, and thereby determining the given point where the feeling mechanism becomes operative. When the roll 43 is raised by the stock, the pawl 35 is thereby brought into locking engagement with the teeth 34 so as to prevent the sector from swinging inwardly, Fig. 4, or toward the left, Fig. 3, while still permitting it to swing freely in an opposite direction as required for successively thinner spots in the leather as detected by the feeler mechanism. For delicately adjusting this mechanism I provide a right and left threaded adjusting nut 44 and a set nut 45 on the link 31.

For rendering my machine more quickly responsive so as to adapt it to very short stock such as taps or counters, or, on the other hand, to the entire length of other stock, I provide fingers 46, see Figs. 2 and 5, in the path of the stock immediately back of the feeler plate 8 and provided with a short crank 47 on the end of its shaft 48 for lifting a lever 49 pivoted at 50 on the frame of the machine, and shown in Fig. 2 as held in inoperative position by a pin 51 but adapted to be thrown down to its dotted line position for engaging a lifting projection 52 on the lever 37, thereby operating the pawl 35 as before explained. The sector 33 is pivotally mounted concentrically of its roll 53, which has toothed engagement with a pinion 54 on the lower end of the shaft 55 which carries at its upper end a similar pinion 56 engaging a rack bar or slide bar 57 slidingly mounted in a heavy cross head 58, see Figs. 1, 2, and 5, on the rear standards 59 of the machine which carry the grade-marking device which is to be set in accordance with the determinations of the feeler or detecting mechanism at the front of the machine. At its outer end the rack bar 57 has a rigid arm 60 pivotally connected by a rigid rod 61 to a T-shaped arm 62 whose segmental rack 63 engages a pinion 64 fast on a stub shaft 65 whose opposite end carries the preferred form of grade-indicating device, herein shown as a marking wheel or die 66 which otherwise operates the same as in my patents.

As shown most clearly in Fig. 6, it will be seen that the rack bar 57 carries a pair of inclines 67 coöperating with an opposite pair of notched cams (by which I mean devices having stop surfaces definitely separated or delimited from each other, as distinguished from the smooth or regular cam surface of the stop-means shown and claimed in my Patents 841,809 and 1,009,988, in which the graduations of the cam surfaces merge smoothly from one to the next, producing a smooth wedging surface), said notched cams being preferably in the form of stepped inclines or wedges 68 mounted respectively on the upper sides of the journal boxes 69 of the gage roll or device or pressure device 70 and acting as stop-means for positively limiting the upward movement of said pressure-device 70. The rack bar 57 is connected at 71 with a spring 72 secured at 73 to the head 58, whereby said rack bar and all the connected mechanism extending therefrom to the feeling mechanism are held constantly in one and the same relation, thereby preventing any possibility of back-play, lost motion, etc. Said inclines or wedges are stepped or provided with a series of successive parallel plane surfaces or impact surfaces very fine and short distances apart (herein shown exaggerated, being actually 1/96th of an inch in height), so that in whatever position they may be adjusted, the vertical movement of the gage-roll or pressure roll 70 as it is lifted by the passing stock will cause one series of flat surfaces to engage the opposite series of flat surfaces perpendicular to their planes, thereby preventing any possibility of jumping or sliding and shifting on each other. These machines are run at a high speed and are required to be extremely accurate, grading and evening the leather with absolute accuracy, and as the front end of a sole, for instance, is brought by the feed chain suddenly beneath the gage-roll or pressure roll 70, the latter is jumped upward forcibly with such suddenness and momentum as to require an absolutely unyielding and positive stop. By providing the stepped construction above explained, there is no tendency to shift or yield laterally, as would be the case if one wedge-surface met another wedge-surface along inclined planes, or even one wedge surface against another surface, whether wedge-shaped or not, as in the graduated cams or stop-means of my last mentioned patents. Moreover, by having the adjusting mechanism on top of the journal boxes, as distinguished from being connected by rods to supports beneath the machine, there is no possibility of give or spring, but the gage-roll or pressure roll 70 is stopped positively and definitely at a given point according to the adjustment of the wedges. The cross head 58 is very heavy and is adjustably mounted at its four corners by any suitable means, a heavy hollow screw 74 being shown as screwing into said head and containing a screw 75 threaded into the standard 59. The lower roll 76 is yieldingly supported by springs 77 in the same manner as shown in my said patent.

As the stock (a shoe-sole for example) is fed through the machine and escapes from the gate 2, the gate drops, thereby locking the segment 33 by the engagement with its edge-teeth 78 of a detent 79 connected by a link 80, see Fig. 5, to a bell-crank 81 connected by a link 82 to said gate. If for any reason the feeler plate 8 should rise after the gaging mechanism is locked, this rising or independent adjustment is permitted by the spring 22 and the slots 13 without affecting either the gaging mechanism or grading mechanism. To aid the gate in closing, I provide a spring 83 connected to said bell-crank. The detent 79 slides in a block 84 mounted on a ledge 85 of the frame which supports the sector and adjacent mechanism. As soon as the stock has passed entirely through the machine, the gage-roll drops and thereby opens the gate, being provided for this purpose with a plunger 86 operating a lever 87 pivoted at 88 and provided with a bar 89 at its opposite end normally resting beneath the crank 90 for operating said gate, see Figs. 1 and 4. Said bar 89 is also connected by a link 91 to a crank 92 on the shaft 48 operated by the fingers 46, so that as soon as the forward end of the stock has passed the feeler plate, said fingers thereupon remove the supporting bar 89 from beneath the crank 90 connected with the gate and leave the latter in condition to drop whenever the stock has escaped therefrom.

For giving extreme delicacy of operation to the tripping mechanism for branding or stamping the grade marks upon the leather and enabling the machine to respond with certainty to thin pieces of leather, I provide special mechanism operated by the lifting of the gage roll or pressure roll 70 by the entrance beneath said roll of the front end of the stock. Pivoted at 93 on the frame of the machine is a lever 94 held in yielding engagement with the rod 86 by a spring 95, and carrying a hook-shaped detent 96 at its opposite end normally held forward by a spring 97 in position to engage a dog 98 pivotally carried at 99 by a cam plate 100 which is free to swing toward and from a clutch 101, see Figs. 4 and 8, being normally held inward by a spring 102. Certain features relating to this clutch, herein shown but not claimed, are duly claimed in my co-pending application Serial No. 219,755, now Patent 1,009,988. The dog 98 is normally in position to almost but not quite engage a shouldered collar 103 fast on the main shaft 104, and is caused to engage said collar by the upward movement of the roll 70, rod 86 and spring 95, which act to lower the detent 96 and dog 98. The instant the shouldered dog 98 is lowered from the position shown in Fig. 1, it is struck by the next following shoulder of the collar 103 which rotates with the drive shaft 104, and instantly shifted to the right, Fig. 1, so as to disengage or release the clutch member 101. The spring 95 is provided to accommodate varying thicknesses of stock. When thus engaged and swung by the rotation of the collar and shaft toward the right, Fig. 1, the dog 98 is held by a spring 105 up against an overhanging stop $x$ of a fixed guide bar $x'$, so that thereafter it cannot accidentally drop against a shoulder of the collar, the cam plate 100 having meanwhile released the pin 106 of the clutch 101, permitting the latter to be moved instantly by its spring 107 to engage the complemental teeth 108 on the hub of a pinion 109 loose on a stub shaft just above said main shaft 104 and geared to the latter by said pinion 109 which also drives a gear 110 on the shaft 111 of the gage-roll 70. The clutch 101 is provided with teeth in mesh with idlers 112, 113 for driving a gear 114 on a shaft 115 provided with a cam 116 for lifting a plunger 117 and permitting the same to fall under the action of springs 118, said plunger being carried by a cross-bar 119 to which the marking wheel 66 and operating mechanism are connected. Said marking wheel is journaled in a hanger 120 supported on rods 121 depending from the cross-bar 119 and sliding in guide ways 122 in a fixed bridge 123, (which may be a part of cross-head 58).

The feeding mechanism is operated by a sprocket chain 124 which operates the sprocket shaft at the rear end of the machine around which the feed chain 7 passes, said feed chain 7, at the front end of the machine, passing around the roll 9, which is peripherally recessed therefor, so as to bring the feed points 6 into the right plane for aiding said roll in feeding the stock. Above the feed chain 7 I provide a special shoe or presser plate 125 for coöperating with said feed chain in giving a strong positive feed for all kinds of stock alike, said shoe or presser plate being heavy and rigid and extending directly in line with and above the teeth or prongs 6 of the feed chain for impaling the leather on said teeth irrespective of the tendency of said leather to bend. I have before provided pressers at the opposite sides of the chain, the result being that very flexible and spongy stock would bend at the edges beneath said pressers and arch more or less out of contact with the impaling prongs. The presser plate 125 is held down yieldingly by springs 126, 127.

The operation of the foregoing machine is as follows: If the operator has been running through number 11 or 12 soles, for instance, and next has a job of number 5 soles, he adjusts the guides 5 correspondingly by means of the hand wheel 4 so as properly to center the stock, and then, the gate 2 being already held in raised position by the bar 89 and connected mechanism extending back to the gage-roll or pressure roll 70, the leather piece is shoved against the feed prongs and quickly lifted into contact with the feeler plate 8 (not herein claimed, but claimed broadly in my Patent No. 1,009,988) which is immediately lifted by the leather piece as the latter is fed inward by the feed chain, said plate yielding to the unevennesses of the stock as the latter passes along. As soon as the front end of the stock reaches the back edge of the feeler plate, it strikes the adjacent fingers 46 which operate to release the gate, and also (in case the piece of stock is a small piece, as a counter or tap, or in case it is intended to grade the stock for its entire length), the operation of said fingers in such case serves to throw the detent 35 into engagement with the sector 33 of the setting mechanism.

As the leather passes along beneath the feeler plate, the latter bends and yields upwardly and downwardly following along the edges of the leather piece under the pressure of the elbow levers 23, 24 actuated by the equalizing spring 26, and as one post 11 or 12, as the case may be, is depressed lower than the other, it correspondingly rocks the shaft 17, and through the connections 30, 31 moves the forward end of the sector 33 outward to the right, each successive increment of downward movement of either of the posts 11, 12 (under the impulse or pull of elements 22, 23 and 24 just mentioned) being deftly and accurately retained by said sector which is engaged, as stated, by its pawl 35 for the purpose. The edge-engagement or grading with reference to a plurality of edge detections, following the variations of edge contour, is not herein claimed, as it is broadly claimed in my co-pending application, now Patent No. 841,809. If counters or the like are being graded, the spring 22 is given a corresponding tension, so as to require the plate 8 to assume a more nearly rigid condition. Said spring 22 also performs another very useful office. It operates, upon the entrance of stock, to compel the quick action of the rock shaft 17 and all its connected parts back to the wedge-carrying bar 57. The spring 22 presses unremittingly upward upon rod 14 and hence always causes the train of parts 15, 16, 17, 30—33, 54, 56, 57—67 to be pulled forward. As this pulling strain is constant, pulling forward at one end of said train of parts, while the spring 72 exerts at the opposite end of said train of parts a rearward pulling strain which is also constant, it follows that no lost motion can take place, and the gaging mechanism must instantly respond to the feeling mechanism with no possibility of uncertainty due to looseness of parts or the like.

In case it is not desired to classify the particular work in hand for its entire length, but only with reference to a portion thereof, the lever 49 is thrown up into its full line position, Fig. 2, so as to be uninfluenced by the fingers 46, and thereupon the grading movements are not retained until the forward end of the stock strikes the roll 43 according to any given adjustment thereof, and thereupon said roll, through its connections 41, 40, 39 and 37, operates the dog 35 the same as before. When the stock has been fully felt of and its desired thinnest portions determined and recorded by said automatic mechanism, the detent 79 immediately locks the sector 33 and retains it and all the connected mechanism back to the gage-roll or pressure roll 70 in immovable position thereafter until the stock has finally passed from the machine, said detent being actuated by the dropping of the gate 2.

The grade-marking device is set by the gradual swinging outward to the right of the sector 33 through the actuation by its opposite end of the parts 54—57, the latter shifting the stepped wedges and thereby positively fixing the extent of vertical movement thereafter possible to the gage-roll, and at the same time, through the connections 60—65, rotating the marking wheel accurately to the proper position for marking the leather, according to its determined grade. The bar and inclines are moved in response to the determinations of the feeler mechanism and, as the bar and inclines are unyieldingly connected directly to the grade-marking device, the latter is accurately and immediately adjusted so that there is no chance for back-play, wabbling, or uncertainty or inaccuracy. So likewise my machine provides positive unyielding connections from the gage-roll to the tripping mechanism so that the latter is instantly moved when the gage-roll is moved. As the gage-roll 70 or pressure roll normally closes against the under roll 76, the leather piece being graded is prevented from escaping from the machine except by the separation of said rolls, and as said separating movement must necessarily operate the trip to release the clutch and set in immediate operation the marking mechanism, it follows that each piece must necessarily be marked and correctly marked before it can pass from the machine, irrespective of whether the leather piece is thick or thin or is spongy or hard, large or small.

I am aware that my invention is capable of a wide variety of embodiments within the spirit and scope of the appended claims, taken in connection with the accompanying drawings and description, and accordingly I wish it understood that the present embodiment herein presented is merely a preferred construction, except as otherwise explicitly stated.
The feeler mechanism at the front of the machine constitutes gage adjusters for automatically governing the grading mechanism or mechanism at the rear of the machine for adjusting and controlling the grade-marking mechanism, while the pawl and ratchet mechanism between the two former constitutes setting mechanism therefor.

Having described my invention, what I claim as new and desire to secure by Letters Patent is:

1. In a machine of the kind described, a frame provided with standards having a heavy cross-head, a gage device movable in said standards toward and from said cross-head, gage-regulating inclines and slide bars mounted in said cross-head for limiting said movement of the gage device, means for moving said inclines and slide bar to different adjustments according to the grade required for correspondingly varying the extent of movement permitted to said gage device, a grade-indicating device, and unyielding connections from said indicating device to said slide bar for setting the indicating device by said bar.

2. In a machine of the kind described, a gage device moved by the passage of the stock, means for limiting said movement of said gage device, automatic setting mechanism for setting said limiting means according to the grade required, a grade-marker, operating mechanism for said marker, including tripping mechanism, and connections from said gage device to said tripping mechanism for directly operating the latter by said movement of said gage device.

3. In a machine of the kind described, a grade marker, automatic means for setting the marker according to the thickness of the stock, a gage roll in position to be engaged by the stock adapted to be positively moved by the passage of said stock, and operating means for the grade marker, including tripping mechanism actuated by said gage roll for governing the operation of said grade marker as set.

4. A machine of the kind described, comprising, in combination, feeler mechanism to detect thin spots in a leather piece, a grade marker to mark the grade upon the leather piece, connections between the feeler mechanism and marker for rendering the latter responsive to the former, and operating means for operating said marker in its marking operations governed by the leather piece, said operating means being constructed and arranged to respond to said piece irrespective of the latter's thickness and character, the aforesaid combination and construction and arrangement including means to prevent the escape of the leather piece from the machine excepting by properly governing said operating means.

5. In a machine of the kind described, feeler mechanism to detect thin spots in a leather piece, a grade marker responsive to said feeler mechanism for its grade adjustment, means for effecting said adjustment said marker being operable to mark the grade upon the leather piece, and operating mechanism for said marker comprising tripping means governed by the leather piece and including a part located to prevent the escape of a leather piece from the machine excepting by actuating said tripping means, said preventing means having an arrangement and construction to permit the said escape in said one way only.

6. In a machine of the kind described, feeler mechanism to detect thin spots in a leather piece, a grade marker responsive to said feeler mechanism for its grade adjustment, means for effecting said adjustment said marker being operable to mark the grade upon the leather piece, and operating mechanism for so operating said marker, including tripping means for said marker, and separable members between which the leather piece must pass in order to escape from the machine, one of said separable members having connection to operate said tripping means.

7. In a machine of the kind described, feeler mechanism to detect thin spots in a leather piece, a grade marker and setting connections therefor responsive to said feeler mechanism, said marker being operable to mark the grade upon the leather piece, and mechanism to so operate the marker, including tripping means for said marker comprising a clutch, means to operate the clutch, opposite separable members between which the leather piece must pass in escaping from the machine, and connections from at least one of said members for operating said tripping means.

8. In a machine of the kind described, feeler mechanism to detect thin spots in a leather piece, a grade marker and setting connections therefor responsive to said feeler mechanism, said marker being operable to mark the grade upon the leather piece, mechanism to operate the marker, including tripping means for said marker, comprising a clutch, means for rendering said clutch effective, opposite separable members between which the leather piece must pass in escaping from the machine, and connections from at least one of said members to operate the latter upon separation of said members.

In testimony whereof, I have signed my name to this specification, in the presence of two subscribing witnesses.

ELMER P. NICHOLS.

Witnesses:
EDWARD MAXWELL,
JAMES R. HODDER.